United States Patent Office 3,184,474
Patented May 18, 1965

3,184,474
REACTION PRODUCT OF ALKENYL SUCCINIC ACID OR ANHYDRIDE WITH POLYAMINE AND POLYHYDRIC MATERIAL
Vincent P. Catto, Elizabeth, and Norman Tunkel, Perth Amboy, N.J., assignors to Esso Research and Engineering Company, a corporation of Delaware
No Drawing. Filed Sept. 5, 1962, Ser. No. 221,447
7 Claims. (Cl. 260—326.3)

This invention relates to a product formed by reacting alkenyl succinic acid (or anhydride) with a polyhydric material and a polyamine, to methods of making said product and to hydrocarbon compositions such as lubricants, heating and fuel oils, gasolines, etc. containing said product.

Recently, various nitrogen-containing derivatives of high molecular weight alkenyl succinic anhydride have become known as sludge dispersants for lubricating oils. Several of such derivatives are described in U.S. Patents 3,018,247, 3,018,250 and 3,018,291. A particularly effective derivative of this general type is prepared by reacting both acidic groups of alkenyl succinic anhydride with a polyamine, e.g. tetraethylene pentamine, as described in Australian patent application No. 63,803, filed August 22, 1960. It has now been found that derivatives, somewhat similar to the last named type, can be made which have rust inhibiting ability and improved sludge dispersing ability. These improved derivatives are made by reacting alkenyl succinic anhydride, or the corresponding alkenyl succinic acid, with a polyamine and a polyhydric material. Both sludge dispersing and anti-rust properties are very desirable in many lubricating compositions, and are particularly desirable in the formulation of premium crankcase motor oils.

The alkenyl succinic anhydride is preferably used in place of the corresponding acid. The alkenyl succinic anhydrides are readily prepared by reacting maleic anhydride with an organic compound having a double bond at its end to thereby give compounds of the general formula

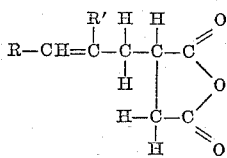

wherein R and R' can be hydrogen or hydrocarbon radicals, either substituted (e.g., chlorinated or sulfurized) or unsubstituted, including aliphatic, acyclic, aromatic radicals, etc., although at least one of said R and R' must be a hydrocarbon group. The total number of carbon atoms in R and R' will generally be 40 to 250 and preferably 70 to 120. Because of its ready availability and low cost, the alkenyl portion of the molecule is preferably obtained by reacting a polymer of a $C_2$ to $C_5$ monoolefin with maleic anhydride, said polymer generally having a molecular weight of about 700 to 3,000, e.g., about 800 to 1300. A preferred example of such an olefin polymer is polyisobutylene.

The preparation of alkenyl succinic anhydride is known in the art, for example, see U.S. 3,018,250, col. 3, lines 57 to 71, Example 1. In general about equal molar proportions of maleic anhydride and the olefinic material are simply heated together. Inert solvents, such as toluene, xylene, oil, etc., can be used as diluents to lower the viscosity of the reaction product in the case of a very viscous alkenyl material to permit easier filtration of the reaction product. The solvent, if volatile, can then be subsequently removed by evaporation at the completion of the reaction. If oil is used as a diluent, then it becomes part of the product.

The polyhydric material, which is used, includes alkylene glycols, polyalkylene glycols and alkanol amines, said polyhydric material containing a total of 2 to 36, preferably 4 to 18, carbon atoms. Examples of alkylene glycols include ethylene glycol, propylene glycol, butanediol-1,4,pentanediol-1,5; hexanediol-1,6, octylene glycol, and other straight or branched chain hydrocarbon glycols. Preferred polyalkylene glycols will include polyethylene glycols of the formula:

$$HO(CH_2CH_2O)_nCH_2CH_2OH$$

wherein $n$ is 1 to 17, preferably 1 to 8; and polypropylene glycol of the formula:

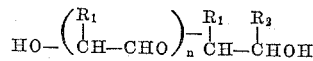

wherein either $R_1$ or $R_2$ is a methyl group and the other is hydrogen; and $n$ is 1 to 11, preferably 2 to 5. Examples of alkanol amines include triethanolamine, diethanolamine, di- and tri-isopropanolamines, etc.

The polyamine reactant can be represented by the general formula:

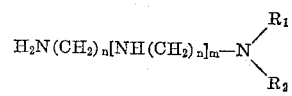

wherein $n$ is 1 to 4, $m$ is 0 to 10, and $R_1$ and $R_2$ are hydrogen or $C_1$ to $C_{10}$ alkyl groups. Preferred polyamines are those wherein $n$ is 2 or 3, $m$ is 0 to 4 and $R_1$ and $R_2$ are hydrogen.

Specific examples of the polyamine reactant include: dimethylaminomethylamine, dimethylaminoethylamine, dimethylaminopropylamine, dimethylaminobutylamine, diethylaminomethylamine, dipropylaminopropylamine, methylpropylaminoamylamine, triethylenetetramine, propylbutylaminoethylamine, ethylenediamine, diethylenetriamine, triethylenetetramine, tetraethylenepentamine, octaethylenenonamine, propylenediamine, tetrapropylenepentamine, etc.

The preferred ratio of reactants is about equal molar proportions of each of the three reactants. However, 0.75 to 2.0 molar proportions of the polyhydric material and 0.75 to 2.0 molar proportions of the polyamine can be used per molar proportion of the alkenyl succinic anhydride. Any excess unreactant material can be simply left in the final product. The final product is not known with certainty, but probably is a complex mixture of a number of compounds since each of the reactants has multiple reaction sites. It is believed that the hydroxy groups of the polyhydric material undergo an esterification reaction with the alkenyl succinic anhydride, while the polyamine reactant is believed to undergo an amidation reaction. Preferably, the polyhydric material is reacted first with the alkenyl succinic anhydride followed by addition and reaction of the polyamine.

The reaction of the invention can be carried out by refluxing the polyhydric material and the alkenyl succinic anhydride for about 1 to 24 hours, then adding the polyamine and refluxing about 1 to 24 hours while removing water of condensation. Water-entraining agents such as toluene or heptane can be used during the entire course of the reaction to help remove water of condensation. The water-entraining agent is later removed from the reaction mass by evaporation.

Lubricating oil compositions for crankcase use will comprise a major proportion of lubricating oil, and 0.25 to 20.0 wt. percent, preferably 1.0 to 5 wt. percent of the final product of the invention. In hydrocarbon oils used for fuel, such as heating oils, kerosene, gasoline, etc., usually about 0.001 to 1.0 wt. percent, preferably 0.01 to 0.1 wt. percent of said final product will be used. Oil concentrates containing 10 to 80 wt. percent of the final product of the invention can also be prepared.

The oil component of the lubricating oil compositions can be a mineral lubricating oil or a synthetic lubricating oil such as diesters, e.g. di-2-ethylhexyl sebacate; complex esters, carbonate esters, polysilicones and other synthetic oils.

The compositions of the invention can also include conventional additives in amounts of 0.05 to 20.0 wt. percent, based on the total composition. For example, oxidation inhibitors such as phenyl-alpha-naphthylamine; rust inhibitors such as sodium nitrite and lanolin; antiwear agents such as tricresylphosphate and zinc dialkyldithiophosphates; other dispersants or detergent additives such as calcium petroleum sulfonate and barium phenate sulfide; V.I. improvers such as polymethacrylates, polyisobutylene; pour depressants; dyes; etc. can be used.

The invention will be further understood by the following examples which include a preferred embodiment of the invention.

EXAMPLE I

*Part A.*—Alkenyl succinic anhydride was prepared as follows:

240 pounds of polyisobutylene of 1,100 molecular weight (Staudinger), and 24 pounds of maleic anhydride were heated together at a temperature of about 485° F. for about 24 hours. The heated mixture was then cooled to about 212° F., and diluted with about 20 gallons of heptane. The composition was then filtered through Hyflo filter aid using a Sparkler filter. Then the heptane was evaporated by blowing nitrogen through the filtrate while heating at about 310° F. The heptane was used simply to reduce the viscosity of the reaction product to permit easier filtering. The recovered reaction product was a viscous material of amber color, and had a saponification number of 63.6 gm. KOH/gm. of reaction product.

*Part B.*—200 grams of the product of Part A above, 19.2 grams of tetraethylene glycol and 50 grams of toluene as a water-entraining agent were heated to reflux at 137° C. for 3 hours in a reaction flask equipped with a Dean-Stark trap. 24.2 grams of tetraethylenepentamine was then added to the reaction flask and reflux was continued at 137° C. for about two more hours until two ml. of water had collected in the Dean-Stark trap. The composition was then stripped of the toluene by nitrogen blowing on a steam bath, which took about 12 hours. The residue was then cooled to give the product of the invention.

*Part C.*—For convenience in handling, an oil solution was made up by dissolving 75 wt. percent of the product of Part B in 25 wt. percent of a light mineral lubricating oil.

The product of Part C above was then tested for sludge dispersing ability in the ER4-90 Ford Sludging Test. Prior experience had shown that this sludging test gives sludge deposits similar to those obtained in operation of New York City taxicabs. Briefly described, in this test, a Ford 6-cylinder engine is run on a dynamometer stand through varying conditions of load, speed, etc., until the desired total test time has elapsed. Make-up oil is added as required so that the oil level at all times is maintained between 3½ and 4 quarts. The engine is inspected at the end of 66, 110, 154, 200, 242 and 286 hours of operation. This inspection is carried out by disassembling the engine sufficiently to visually examine the following 8 parts for sludge:

Rocker arm cover
Rocker arm assembly
Cylinder head
Push rod chamber
Push rod chamber cover
Crankshaft
Oil pan
Oil screen Each part, except the oil screen, is visually rated on a numerical scale wherein 10 is perfectly clean and 0 is completely fouled. Numbers between 0 and 10 denote varying amounts of deposits. The seven parts (omitting the oil screen) are rated by a single merit rating. The oil screen is rated as percent of area covered by sludge.

Composition 1

A lubricating oil composition containing the product of Part C above was prepared by simple mixing of the following ingredients.

1.33 wt. percent of the oil solution of Part C
3.5 wt. percent of detergent-inhibitor
.9 wt. percent of an oil solution consisting of 74 wt. percent of a zinc dialkyldithiophosphate and 26 wt. percent oil
94.27 wt. percent of a mineral lubricating oil having a viscosity of 325 SUS at 100° F. and a V.I. of 100

Detergent-inhibitor is a commercial oil concentrate of a heavy duty detergent-inhibitor lubricating oil additive.

The diethiophosphate was prepared by $P_2S_5$ treating a mixture of isobutanol and amyl alcohol, followed by neutralization with zinc oxide.

Composition 2

A comparison composition was prepared exactly as Composition 1, except that in place of the 1.33 wt. percent of the oil solution of Part C, there was used 1.33 wt. percent of a commercial concentrate consisting of 25 wt. percent mineral lubricating oil and 75 wt. percent of a material having the formula:

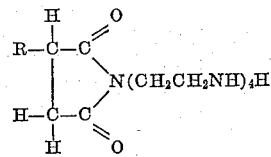

where R was a polyisobutenyl group of about 830 mol. wt.

Composition 3

A comparison composition was made up exactly as Composition 1, but with an additional 1.33 wt. percent of the mineral oil having the viscosity of 325 SUS at 100° F. and no dispersant, i.e. none of the oil solution of Part C.

Compositions 1 to 3 were tested in the ER 4-90 test previously mentioned and the results are summarized in Table I which follows:

TABLE I.—MERIT RATINGS—ER 4-90 ENGINES TEST

| Oil blend | 66 hrs. | 110 hrs. | 154 hrs. | 200 hrs. | 242 hrs. | 286 hrs. |
|---|---|---|---|---|---|---|
| Composition 1 | 9.99 | 9.98 | 9.94 | 9.95 | 9.8 | 9.6 |
| Composition 2 | 9.99 | 9.9 | 9.8 | 9.6 | 8.8 | 8.8 |
| Composition 3 | 9.98 | 9.9 | 9.2 | 7.4 | 6.9 | 6.7 |

The merit results of Table I were an average of the 7 areas of inspection previously described. In the case of Compositions 1 and 2, no sludge was found on the oil screens, indicating that the sludge dispersants of both Compositions 1 and 2 had so finely dispersed the sludge that formed during the engine operation that the sludge could not be filtered by the normal oil filter. On the other hand, the compositions of Composition 3 showed 5% oil screen plugging after 242 hurs and 10% plugging after 286 hours.

The superiority of Composition 1 of the invention over the related prior art material of Composition 2 in sludge dispersancy is clearly shown, particularly after 242 and 286 hours of test.

A Witte engine test was also carried out. This test involves the operation of a single cylinder engine for about 90 hours of operation on the oil composition to be tested.

Composition 4

An oil composition was prepared by simple mixing of the following:

3.3 wt. percent of the product of Part C
.9 wt. percent of the zinc dialkyldithiophosphate solution of Compositions 1, 2 and 3
95.8 wt. percent of mineral lubricating oil having a viscosity of 325 at 100° F.

Composition 5

This composition was prepared exactly like Composition 4, except that 3.3 wt. percent of the oil solution of the comparison dispersant of Composition 2 was used in place of the 3.3 wt. percent of the product of Part C.

The test results of Compositions 4 and 5 in the Witte engine test are summarized in Table II.

TABLE II.—WITTE ENGINE TEST

| Test oil | RZ | RZ-1 | Percent TGF |
| --- | --- | --- | --- |
| Composition 4 | .07 | .03 | 12 |
| Composition 5 | .15 | .09 | 22 |

Composition 4 representing the invention, resulted in a considerably cleaner engine as measured by the total ring zone deposits on the cylinder (RZ), the deposit on the ring zone below the first groove (RZ-1), and the total groove fill (TGF). For example the composition of the invention (Composition 4) had a demerit rating of .07 in the ring zone, as compared to a demerit rating of 0.15 for comparison Composition 5. Table II clearly shows the improvement represented by incorporating both a glycol and polyamine group into the molecule as opposed to Composition 5 where only the polyamine group is present. While the results of Table I also showed the improvement, said results were somewhat masked by the presence of the detergent-inhibitor, which also has some sludge dispersing properties.

EXAMPLE II 300 grams of the polyisobutenylsuccinic anhydride of Part A of Example I, 28.6 grams of triethanolamine, and 45 grams of toluene were refluxed together for 2.5 hours at a temperature ranging from 168 to 177° C. Then 36.3 grams of tetraethylenepentamine was added to the hot refluxing mixture and the composition was heated for another 8 hours during which time 9.2 ml. of water was distilled over and collected in a water trap. The toluene was then evaporated by distillation under reduced pressure. The composition was then cooled, resulting in a dark viscous polymer having a reddish cast.

Part B.—75 wt. percent of the product described above was dissolved in 25 wt. percent of the mineral oil having a viscosity of 325 SUS at 100° F.

Compositions 6 to 8

Compositions 6 and 7 were prepared by adding 1.33 wt. percent of the products of Part C of Example I and Part B of Example II, respectively, to a fully formulated premium 10W-30 motor oil. Composition 8 was made by adding 1.33 wt. percent of the commercial concentrate of Composition 2 to the same motor oil. This premium motor oil had the following composition:

46.9 parts low cold test coastal distillate of 76 SUS/100° F. and 63 V.I.
46.9 parts Mid-Continent neutral, 150 SUS/100° F. and 100 V.I.
5.0 parts Additive A.
1.0 part Acryloid 710
0.2 part Additive B The inspections on this base stock blend are:

| | |
| --- | --- |
| Gravity, API | 30.8 |
| SUS vis./100° F. | 181.3 |
| SUS vis./210° F. | 48.6 |
| Pour, ° F. | -35 |
| Cloud, ° F. | 6 |
| Flash COC, ° F. | 360 |
| Fire COC, ° F. | 385 |

Additive A is a 33 wt. percent solution of polyisobutylene of about 10,000 molecular weight in 67 wt. percent of a solvent neutral mineral oil of 150 SUS viscosity at 100° F.

The Acryloid 710 was a polymethacrylate viscosity index improver.

Additive B consisted of 37½ volume percent of a copolymer of Lorol B fumarate and vinyl acetate, 12.5 volume percent of the condensation product of chlorinated wax and naphthalene and 50 volume percent of a neutral mineral oil of 45 SUS at 100° F. The copolymer is primarily a viscosity index improver while the condensation product is a pour depressant.

Compositions 6 to 8 were tested for rust inhibition. The test employed was a very severe one especially designed to predict rusting of hydraulic valve lifters.

The test is run as follows:

New 1958 Oldsmobile valve lifters (cast iron containing a small amount of nickel) are disassembled into body and plunger. These pieces are degreased with solvent and are then allowed to dry. An agar gel collar is cast over the bottom half of each of the two lifter pieces. This collar promotes corrosion by masking half of each lifter piece from oxygen availability during the test, i.e., setting up an oxygen concentration cell. Ten grams of the test oil is diluted to 100 gm. with hexane. Clean and dry test pieces are soaked in the test solutions for one hour, removed and air dried for 30 minutes. This leaves a very thin test oil film on the test pieces. The coated pieces are then covered with water which is aerated and held at 110° F. for twenty hours. Both water and agar gel contain $BaCl_2 \cdot 2H_2O$ for added severity. The pieces show rust in two areas—red rust above the agar (exposed to oxygen-rich water) and black rust under the agar (exposed to oxygen-poor water). The two areas are rated for percent area covered with rust and the ratings for the two areas averaged. In the test bath, test pieces coated with the uninhibited premium motor oil is carried along as an internal standard to compensate for minor variations in bath conditions. The final rating compares the inhibited test oil to the non-inhibited standard as follows. The rusted area of the pieces coated with test oil is subtracted from the rusted area of pieces coated with the standard. The number obtained is divided by the rusted area of the standard and multiplied by 100 to yield the percent improvement over the standard. Thus, the maximum value obtainable is 100% (perfectly clean), while 0% demonstrates equivalence to the standard and negative values indicate promotion of rust.

Compositions 6 and 7, each gave a rust reduction of 95% as compared to a rust reduction of 52% of the area covered obtained by Composition 8.

As a further example of the invention, Example I, Parts A, B, and C can be repeated, but using dimethylaminomethyleneamine in place of said tetraethylene pentamine, in a molar amount equal to the molar amount of said tetraethylene pentamine used in said Example I.

As a still further example of the invention, 0.01 wt. percent of the product of Part B of Example I can be added to gasoline.

What is claimed is:

1. The mineral-oil-soluble reaction product of claim 3, wherein said polyhydric material is tetraethylene glycol, said polyamine is tetraethylene pentamine, and said acidic material is polyisobutenyl succinic anhydride prepared from polyisobutylene of 700 to 3000 molecular weight.

2. The mineral-oil-soluble reaction product of claim 3, wherein said polyhydric material is triethanol amine, said polyamine is tetraethylene pentamine, and said acidic material is polyisobutenyl succinic anhydride prepared from polyisobutylene of about 700 to 3000 molecular weight.

3. A mineral-oil-soluble reaction product prepared by refluxing a polyhydric material containing 4 to 18 carbon atoms selected from the group consisting of polyalkylene glycol, alkylene glycol and alkanol amines, with an acidic material selected from the group consisting of alkenyl succinic anhydride and alkenyl succinic acid wherein said alkenyl group contains 40-250 carbon atoms, for about 1 to 24 hours, adding polyamine of a formula:

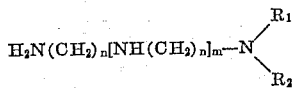

wherein $n$ is 2 to 3, $m$ is 0 to 4, and $R_1$ and $R_2$ are hydrogen, and refluxing for 1 to 24 hours while removing water of condensation, wherein 0.75 to 2.0 molar proportions of said polyhydric material and 0.75 to 2.0 molar proportions of said polyamine are used per molar proportion of said acidic material.

4. A method according to claim 7, wherein said polyhydric material is tetraethylene glycol, said polyamine is tetraethylenepentamine and said alkenyl succinic anhydride is polyisobutenyl succinic anhydride prepared from polyisobutylene of 700 to 3,000 molecular weight.

5. A method according to claim 7, wherein said polyhydric material is triethanol amine, said polyamine is tetraethylene pentamine and said alkyl succinic anhydride is polyisobutylene succinic anhydride prepared from polyisobutylene of about 700 to 3,000 molecular weight.

6. A method according to claim 7, wherein substantially equal molar amounts of said polyhydric material, said alkenyl succinic anhydride and said polyamine are reacted.

7. A method of preparing a product which is soluble in mineral lubricating oil and has sludge dispersing and rust preventive properties which comprises refluxing .75 to 2.0 molar proportions of a polyhydric material selected from the group consisting of alkylene glycols, polyalkylene glycols and alkanol amines, said material containing 2 to 3 hydroxy groups per molecule and having a total of 4 to 18 carbon atoms, with one molar proportion of alkenyl succinic anhydride wherein said alkenyl group contains 40 to 250 carbon atoms, for 1 to 24 hours, then adding 0.75 to 2.0 molar proportions of polyamine of the formula:

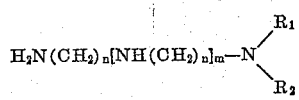

wherein $n$ is 2 to 3, $m$ is 0 to 4, and $R_1$ and $R_2$ are hydrogen and continuing said refluxing for an additional 1 to 24 hours while removing water of condensation.

References Cited by the Examiner

UNITED STATES PATENTS

| 2,970,158 | 1/61 | Levis | 260—404.5 |
| 3,017,416 | 1/62 | Lo et al. | 260—326.5 |
| 3,018,250 | 1/62 | Anderson et al. | 252—51.5 |
| 3,024,195 | 3/62 | Drummond et al. | 252—51.5 |
| 3,029,250 | 4/62 | Gaertner | 260—326.5 |
| 3,035,070 | 5/62 | Carpenter et al. | 260—404.5 |

IRVING MARCUS, *Primary Examiner.*

D. E. WYMAN, NICHOLAS S. RIZZO, WALTER A. MODANCE, *Examiners.*